(12) United States Patent
Hayakawa

(10) Patent No.: US 6,373,434 B1
(45) Date of Patent: Apr. 16, 2002

(54) DISTANCE DETECTING METHOD AND ITS APPARATUS

(75) Inventor: Tadashi Hayakawa, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/260,494

(22) Filed: Mar. 2, 1999

(30) Foreign Application Priority Data

Mar. 5, 1998 (JP) ............................................. 10-073186

(51) Int. Cl.[7] ................................................. G01S 1/24
(52) U.S. Cl. ....................................... 342/387; 342/458
(58) Field of Search ............................... 342/458, 125, 342/127, 387

(56) References Cited

U.S. PATENT DOCUMENTS

| | | | |
|---|---|---|---|
| 3,714,650 A | * 1/1973 | Fuller et al. ................. 342/125 |
| 4,128,835 A | 12/1978 | Russell | |
| 4,357,609 A | * 11/1982 | Spencer ....................... 342/125 |
| 4,665,404 A | 5/1987 | Christy et al. ............... 342/463 |
| 4,804,961 A | * 2/1989 | Hane .......................... 342/125 |
| 5,036,330 A | 7/1991 | Imae et al. ................. 342/375 |
| 5,056,106 A | 10/1991 | Wang et al. ................. 342/458 |
| 5,220,332 A | * 6/1993 | Beckner ...................... 342/125 |
| 5,508,708 A | 4/1996 | Ghosh et al. ................ 342/457 |
| 5,550,549 A | 8/1996 | Procter, Jr. ................. 342/47 |
| 5,818,385 A | * 10/1998 | Bartholomew .............. 342/372 |
| 5,974,039 A | * 10/1999 | Schilling .................... 455/456 |

FOREIGN PATENT DOCUMENTS

| | | |
|---|---|---|
| EP | 389325 | 9/1990 |
| JP | 5122120 | 5/1993 |

OTHER PUBLICATIONS

An English Language abstract of JP 5–122120.

* cited by examiner

Primary Examiner—Gregory C. Issing
(74) Attorney, Agent, or Firm—Greenblum & Bernstein, P.L.C.

(57) ABSTRACT

A signal having periodicity is transmitted to a communication station B based on a reference timing generated by a timer which a communication station A has, while the communication station B, which has received a transmitting signal of the communication station A, receives a signal generated based on a reference timing generated in its internal section and transmitted, and a phase difference between the transmitting signal and the received signal is detected so as to detect a distance between the communication station A and the communication station B.

7 Claims, 10 Drawing Sheets

FIG. 7
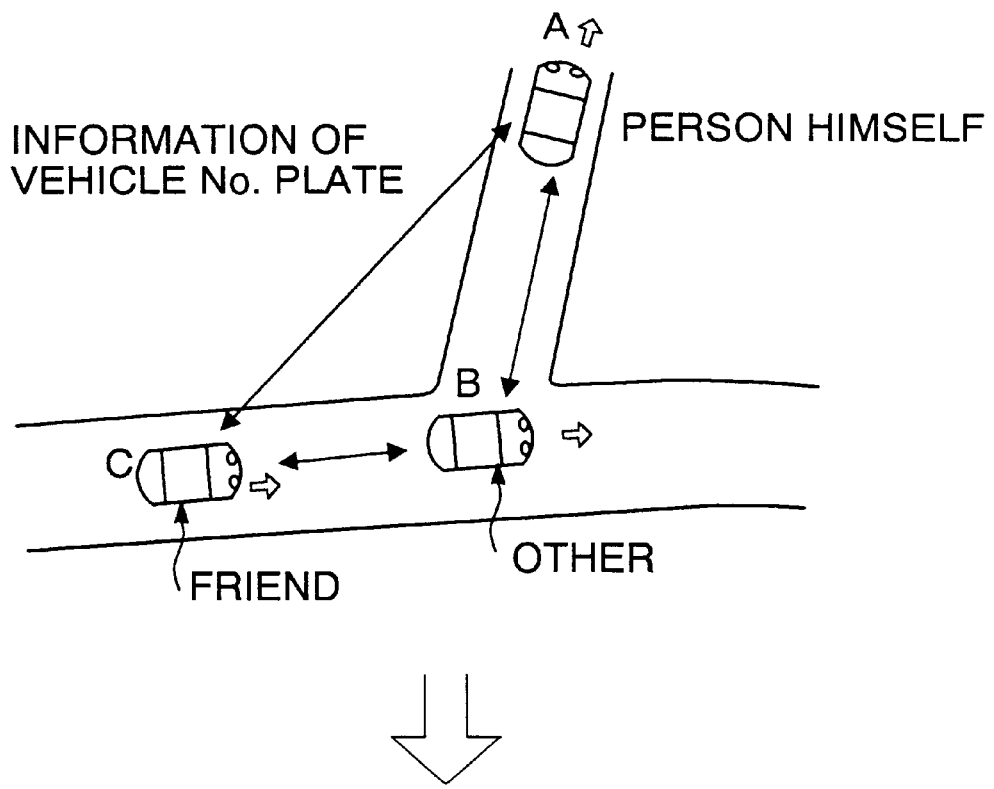
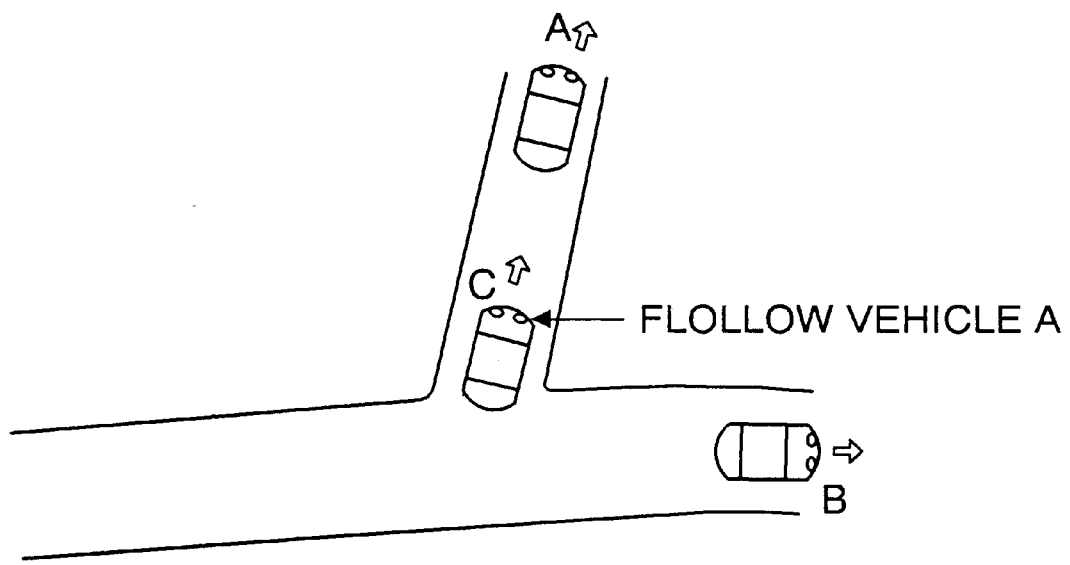

DISTANCE DETECTING METHOD AND ITS APPARATUS

BACKGROUND OF THE INVENTION

1. Field of the Invention

The present invention relates to a distance detecting method suitable for detecting a relative distance between mobile stations or between a mobile station and a base station, and its apparatus, and particularly to a distance detecting method applicable to a mobile communication system using a spread spectrum communication system and its apparatus.

2. Description of the Related Art

In recent years, a detecting system for detecting a relative distance between two mobile stations using a spread spectrum communication system has been developed. For example, in an inter-vehicle communication apparatus described in Japanese Patent Application Unexamined Publication No. Hei-5-122120, a certain communication station (self-vehicle) MS-1 radio transmits a spectrum spread signal to the other communication station (other vehicle) MS-2, and the other communication station MS-2 receives the spectrum spread signal from the communication station M-1. Then, the other communication station M-1 modulates the transmission data using spreading code and sends the spread signal back to the communication station MS-1. The certain communication station MS-1 receives that response from the other communication station MS-2. Then, the communication MS-1 detects a time difference between the transmission of the transmitted signal sent from the communication station MS-1 and the received signal sent from the other communication station MS-2, and a relative distance between two communication stations is obtained by the following equation:

Relative distance=velocity of light×time difference/2

The above-mentioned inter-vehicle communication apparatus is predicated on the following point.

More specifically, the receiver station receives the transmission signal from the sender station. At this time, the receiver station performs spreading modulation. In this spreading modulation, the response data is spread by a spreading code whose head substantially coincidence with a reception timing, and transmits the spread signal to the sender station. In other word, it is required that the receiver station generates the spreading code in synchronization with the reception sgnal and sends back the response signal. For this reason, it is difficult to insert various data for other than the detected distance to the transmission signal in CDMA system.

Also, the sender station performs the distance detection based on the premise that the receiver station sends back the response signal spread by the spreading code synchronized with the reception signal. For this reason, the synchronous accuracy in the receiver station has a direct influence upon the accuracy of the distance detection.

SUMMARY OF THE INVENTION

In consideration of the above problem, the present invention has been made, and an object of the present invention is to provide a distance detecting method and its apparatus wherein a sender station and a receiver station can receive and transmit a signal asynchronously by use of a spreading code generated at a timer of each station, other information can be simultaneously transmitted and a distance detection having high reliability can be performed without exerting influence upon synchronous accuracy of the receiver station.

In the distance detection method of the present invention, a signal having periodicity is transmitted to a communication station B based on a reference timing generated by a timer which a communication station A has, while the communication station B, which has received the transmitting signal of the communication station A, transmits a signal, which is generated based on a reference timing generated in its internal section and receives the signal. Then, a phase difference between the transmitting signal and the receiving signal is detected so as to obtain a distance between the communications stations A and B.

According to the present invention, the distance detection is carried out by the phase difference including the difference of the reference timing between the communication stations and propagation delay time, each communication station may receive and transmit the signal asynchronously with the reception timing at the timer of the self-station. As a result, the distance detection can be easily carried out without exerting a large influence upon communications of other information, and high detection accuracy can be realized without exerting influence upon synchronous accuracy of the target station.

Also, in the distance detecting method of the present invention, a signal having periodicity is generated based on the timer of the self-station and is transmitted to the target station, while the self-station receives a signal, which is generated based on the timer of the target station and transmitted therefrom. Then, by use of the phase difference between the transmitting signal transmitted from the self-station to the target station and the receiving signal received from the target station, the relative distance between the self-station and the target station is detected.

According to the present invention, the distance detection is carried out by the phase difference including the difference of the reference and propagation delay time, each of the self-station and the target station may receive and transmit the signal asynchronously with the reception timing based on the timer of each station. As a result, the distance detection can be easily carried out without exerting a large influence upon communications of other information, and high detection accuracy can be realized without exerting influence upon synchronous accuracy of the target station.

Also, in the distance detecting method and its apparatus of the present invention, the receiving signal received from the target station is demodulated so as to obtain a target station detecting phase difference. Then, by use of the target station detecting phase difference and a self-station detecting phase difference, the relative distance between the self-station and the target station is detected based on the following equation:

Distance=K×(target station detecting phase difference+self-station detecting phase difference)/2 where K is a constant corresponding to velocity of light.

According to the above-mentioned configuration, since the distance detection can be carried out by use of the phase difference detected by the target station and the phase difference detected by the self-station, each of the self-station and the target station can receive and transmit the signal asynchronously with the reception timing based on the timer of each station.

Also, in the distance detecting method and its apparatus of the present invention, the receiving signal received from the target station is demodulated so as to obtain the target station detecting phase difference. Then, by use of the target station detecting phase difference and the self-station detecting phase difference, the difference of the reference timing between the timer of the self-station and the timer of the target station is detected.

According to the above-mentioned configuration, the difference of the reference timing between the timer of the self-station and the timer of the target station can be detected by use of the target station detecting phase difference and the self-station detecting phase difference. As a result, the timer shift between the self-station and the target station can be easily corrected.

Also, in the distance detecting method and its apparatus of the present invention, the receiving signal is synchronized with the reference timing of the timer of the target station and is spread modulated. Then, a despreading code is synchronized with the reference timing of the timer of the self-station and is relatively shifted. A correlation value between the receiving signal and the despreading code is detected. The self-station detecting phase difference is obtained based on the number of shifts showing a maximum correlation value and a shift amount per one time.

According to the above-mentioned configuration, the self-station detecting phase difference can be easily obtained by use of a sliding correlator in performing a spectrum spread communication.

BRIEF DESCRIPTION OF THE DRAWINGS

Other objects and further features of the present invention will be apparent from the following detailed description when read in conjunction with the accompanying drawings, in which:

FIG. 7 is a view showing the positional relationship between vehicles according to a third embodiment of the present invention;

DETAILED DESCRIPTION OF THE PREFERRED EMBODIMENTS

Embodiments of the present invention will now be specifically explained with reference to the accompanying drawings.

(First embodiment)

Figure 1:
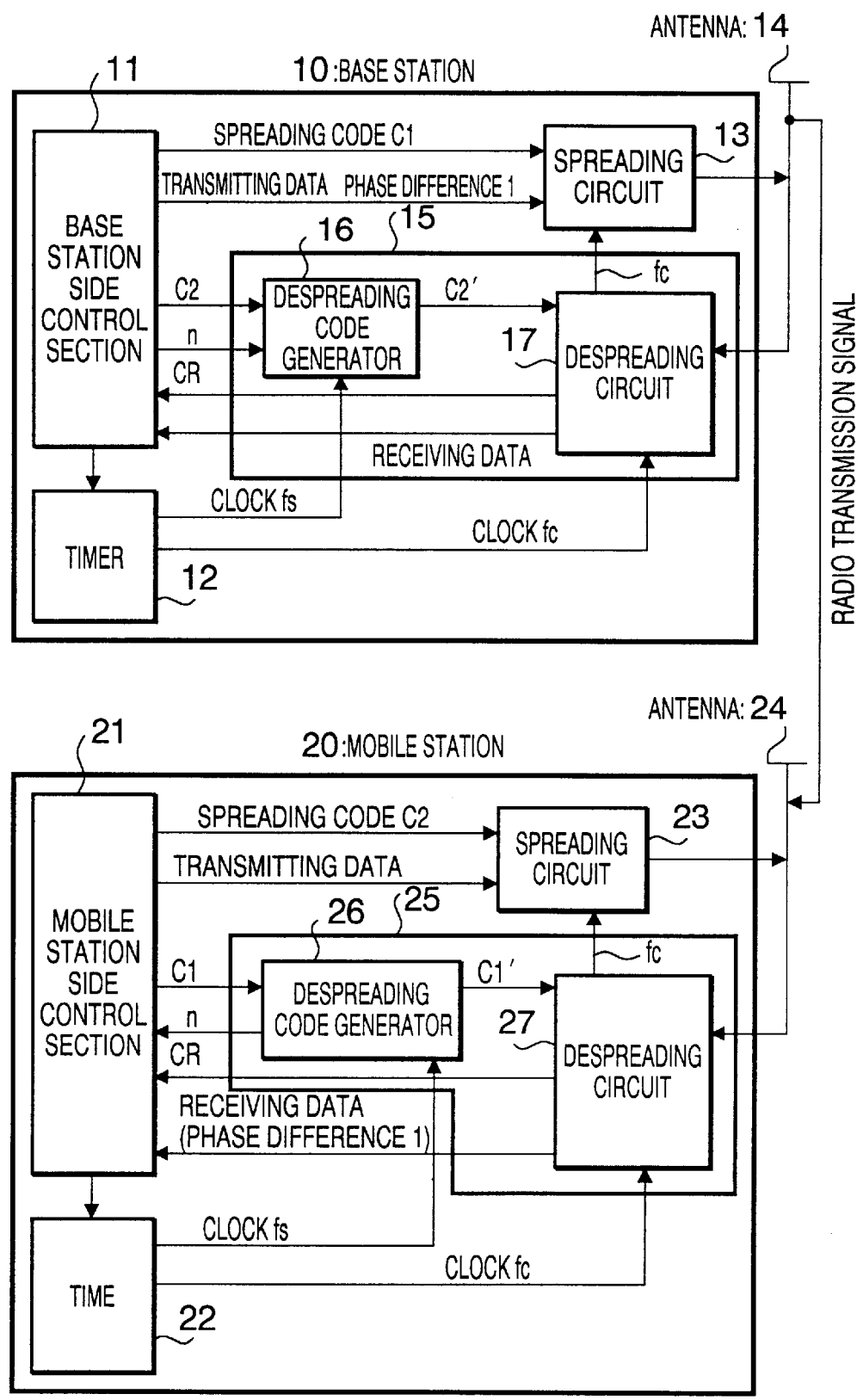
FIG. 1 is a block diagram showing a base station and a mobile station according to a first embodiment of the present invention.

FIG. 1 shows a functional block of the base station and the mobile station where radio communication of CDMA system can be carried out.

This embodiment shows a case in which CDMA radio communication is carried out between a mobile station as a self-station and a base station as a target station so as to detect a relative distance between the mobile station and the base station. The following will explain the radio communication using CDMA system as one of spread spectrum communication systems.

A base station 10 comprises a base station control section 11, a timer 12, a spreading circuit 13, an antenna 14, and a sliding correlator 15. The base station control section 11 has operation functions for communication control and distance detection. The timer 12 generates clocks for a sample rate fs (period Ts) and a chip rate fc (period Tc). The spreading circuit 13 spreads transmission data. The antenna 14 transmits a spread signal and receives a radio signal. The sliding correlator 15 demodulates a receiving signal. The base station control section 11 comprises a CPU, a DSP, a memory, etc. Moreover, the base station control station 11 has a phase difference detecting function to be described later in addition to the original functions for the base station. The sliding correlator 15 comprises a despreading code generator 16 and a despreading circuit 17. The despreading code generator 16 shifts a spreading code and generates a despreading code in order to obtain a correlation with the receiving signal. The despreading circuit 17 outputs a correlation value obtained by multiplying the receiving signal by the despreading code.

On the other hand, a mobile station 20 comprises the same functional block as that of the base station 10 in order to perform the spread spectrum communication. More specifically, the mobile station 20 comprises a mobile station control section 21, a timer 22, a spreading circuit 23, an antenna 24, and a sliding correlator 25. The mobile station control section 21 comprises a CPU, a DSP, a memory, etc. Moreover, the mobile station control station 21 has a phase difference detecting function and an operation function for detecting a relative distance between the mobile station 20 and the base station 10 in addition to the original functions for the mobile station. The sliding correlator 25 comprises a despreading code generator 26 and a despreading circuit 27. The despreading code generator 26 shifts a spreading code and generates a despreading code in order to obtain a correlation with the receiving signal. The despreading circuit 27 outputs a correlation value obtained by multiplying the receiving signal by the despreading code.

Actions of the above-structured embodiment will be explained with reference to timing charts of FIGS. 2 and 3.

Figure 2:
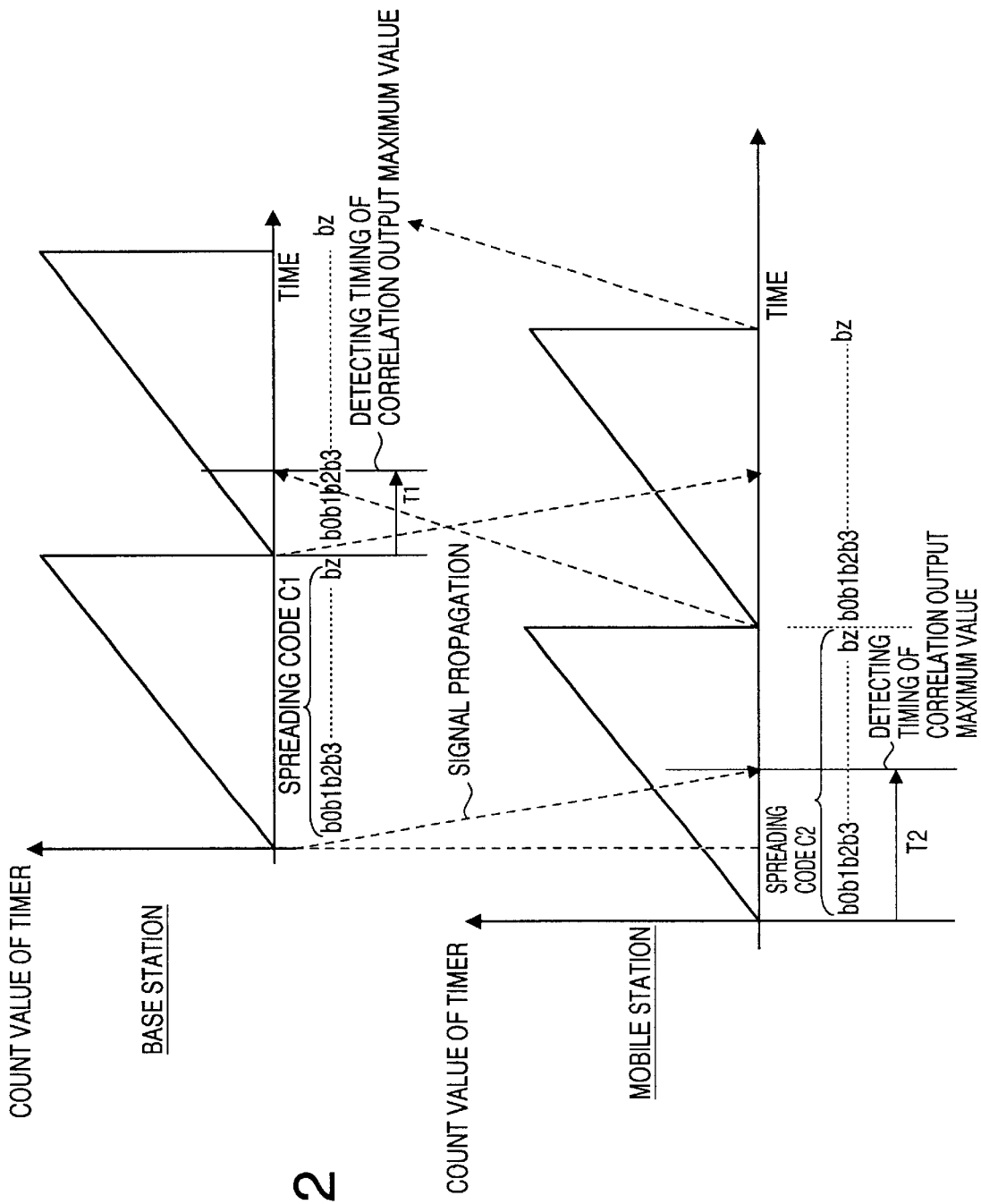
FIG. 2 is a timing chart of spectrum communications between the base station and the mobile station according to the present invention.

FIG. 2 shows a state in which spread spectrum communication between the base station 10 and the mobile station 20 is carried out based on a reference timing provided by each of timers 12, 22.

In the base station 10, when transmission data is input to the spreading circuit 13 from the base station control section 11, the spreading circuit 13 spreads transmission data at a predetermined chip rate fc using a spreading code C1 at transmission timing provided by the timer 12. Then, spread data is radio transmitted from the antenna 14.

At this time, in the spreading circuit 13, transmission data is multiplied by the spreading code C1 at the clock fc of the chip rate generated by the timer 12 so as to be spectrum spread. Timing, which the head of the spreading code C1 for spectrum spreading transmission data generates, is determined by a clock generated by the timer 12 so as to be adjusted to the reference timing. Mover specifically, when a count value of the clock fc of the timer 12 is 0, the spreading code C1 is generated such that transmission data is multiplied by the head of the spreading code C1. Also, when the count value reaches to a maximum value, the tail of the spreading code C1 is multiplied by transmission data, and the count value is reset at the next clock, so that the count value becomes 0 again and the head of the spreading code C1 appears.

Thus, a signal (spectrum spreading signal) having periodicity generated based on the reference timing, which the timer 12 built in the base station 10 periodically provides, is radio transmitted to the mobile station 20. The signal radio transmitted from the base station 10 reaches the mobile station 20 after propagation time Td, which is proportional to the distance between the mobile station 20 and the base station 10.

While, in the mobile station 20, similar to the base station 10, transmission data to be provided to the spreading circuit 23 from the mobile station control section 21 is spectrum spread by a spreading code C2 based on the reference timing provided from the timer 22 of the self-station. Then, spectrum spread data is radio transmitted from the antenna 24.

Thus, a signal (spectrum spreading signal) having periodicity generated based on the reference timing, which the timer 22 built in the mobile station 20 periodically provides, is radio transmitted to the base station 10. If the time that lapses before the radio transmitted signal reaches the base station 10 from the mobile station 20 is small, the same propagation channel as that of the signal transmission from the base station 10 to the mobile station 20 is used. Therefore, the time lapse of the signal transmission from the signal transmission to the base station 10 is the same propagation time Td as that of the signal transmission from the base station 10 to the mobile station 20.

In the mobile station 20, the received signal received by the antenna 24 is input to the despreading circuit 27 and a despreading code C1' generated by the despreading code generator 26 is also input to the despreading circuit 27. The depreading code C1' is generated by sequentially shifting the same spreading code C1 as the spread code used in the spread spectrum on the sender side. Namely, as shown in FIG. 2, the head of the spreading code C1 is adjusted to timing (reference timing) wherein the counter value of the timer 22 of the self-station is 0. Then, the spreading code C1 is sequentially shifted at sampling period Ts until the count value reaches to a maximum value and is reset.

At this time, a correlation output CR between a data sequence from the despreading circuit 27 and the despreading code C1' is output to the mobile station control section 21. The mobile station control section 21 detects time at which the highest correlation output CR can be obtained. This correlation processing is referred to as spreading pattern matching of despreading.

In the mobile station 20, time required to obtain the maximum value of the correlation output CR by the spreading pattern matching of despreading includes the aforementioned propagation delay Td and timer shift time between reference timing of the timer 12 of the base station 10 as the sender side and that of the timer 22 of the mobile station as the receiver side. The time that lapses before the-maximum value of the correlation output CR is obtained with reference to the reference timing provided by the timer 22 of the mobile station 20 is set to a phase difference T2 serving as a self-station detecting phase difference.

The sampling rate fs is multiplied by a factor of N times (integer of $N \geq 1$) of the chip rate fc and the number of shift times n that is carried out before the maximum correlation output is detected is used. Then, the phase difference T2 is obtained from the following equation:

$$\text{Phase difference } T2 = n \times Ts \tag{1}$$

Also, in the base station 10, the signal received from the mobile station 20 is subjected to the spreading pattern matching of despreading based on the reference timing provided by the timer 12 of the base station 10. Thereby, the time that lapses before the maximum value of the correlation output CR can be obtained with reference to the reference timing provided by the timer 12 of the base station 10=phase difference T1 can be obtained. The phase difference T1 serves as a target station detecting phase difference.

Figure 3:
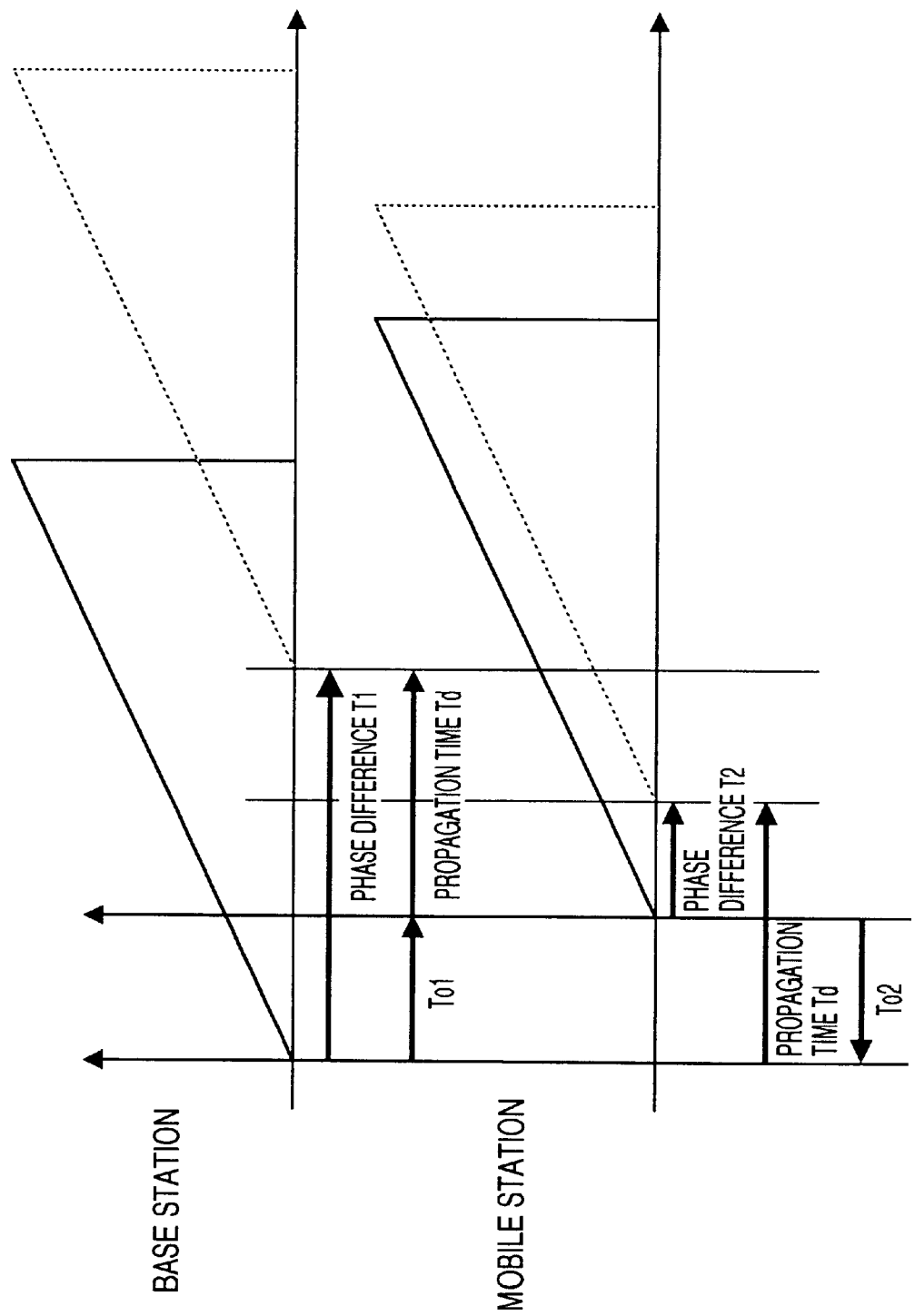
FIG. 3 is a timing chart for explaining phase differences detected by the base station and the mobile station according to the first embodiment of the present invention.

FIG. 3 shows phase differences T1, T2 detected by the base station 10 and the mobile station 20, respectively, propagation delay Td, and timer shifts T01, T02, which are time differences of the reference timing. As shown in the figure, when no synchronization between the communication stations (base station and mobile station) cannot be obtained, the timer shift on the sender side is set to T0n with reference to the receiver side, and phase difference Tn can be expressed by the following equation:

$$\text{Phase difference } Tn = \text{sender side synchronous shift } T0n \text{ seen from the receiver side} + \text{propagation time } Td \tag{2}$$

Also, the relationship shown by the following equation (3) and (4) is established:

$$T02 + \text{propagation time } Td = \text{phase difference } T2 \tag{3}$$

$$T01 + \text{propagation time } Td = \text{phase difference } T1 \tag{4}$$

where the difference of the timer 12 of the base station 10 is T02 with reference to the mobile station 20, the difference of the timer 22 of the mobile station 20 is T01 with reference to the base station 10, the phase difference, which is obtained when the base station 10 is the sender side and the mobile station 20 is the receiver side, is phase difference T2, and the phase difference, which is obtained when the mobile station 20 is the sender side and the base station 10 is the receiver side, is phase difference T1.

When the timer 22 of the mobile station 20 advances by T01 with reference to the base station 10, the timer 12 of the base station 10 conversely delays by T02 with reference to the mobile station 20.

Therefore, the relationship of T01=−T02 is established. Then, if the equations (3) and (4) are added to each other, the timer shifts of the left sides are cancelled each other, and only propagation time Td is left on the left side, distance L between the base station 10 and the mobile station 20 can be calculated.

$$\text{Propagation time } Td = (\text{phase difference } T1 + \text{phase difference } T2)/2 \tag{5}$$

$$\text{Distance } L = \text{velocity of light} \times (\text{phase difference } T1 + \text{phase difference } T2)/2 \tag{6}$$

Also, if the equations (3) and (4) are subtracted from each other, propagation time Td of the left sides are cancelled each other, and only timer shift is left on the left side, the synchronous shift can be calculated.

$$T01 = (\text{phase difference } T1 - \text{phase difference } T2)/2 \tag{7}$$

$$T02 = (\text{phase difference } T2 - \text{phase difference } T1)/2 \tag{8}$$

If time is corrected by only the calculated timer shift, the distance L can be obtained by the following equations:

Distance $L$=velocity of light×(phase difference $T1$−timer shift $T01$)

Distance $L$=velocity of light×(phase difference $T2$−timer shift $T02$)

According to this embodiment, in the case where the mobile station 20 detects the distance between the base station 10 and the mobile station 20, the base station 10, which has received the signal from the mobile station 20, transmits phase difference T01, serving as transmission data, detected based on the reference timing of the timer 12 to the mobile station 20.

The mobile station 20 demodulates received data of the phase difference T01 received from the base station 10, and obtains phase difference T01 detected by the base station 10. While, the mobile station 20 detects phase difference T2, which is based on the reference timing of the timer 22, by despreading pattern matching with received data of the phase difference T01.

The mobile station control section 21 calculates distance L between the mobile station 20 and the base station 10 based on the aforementioned equation (6). Or, the timer shift T02 of the base station 10 with reference to the mobile station 20 and the timer shift T01 of the mobile station 20 with reference to the base station 10 are detected based on the aforementioned equations (7) and (8). Then, the shift amount of the timer is corrected based on the equation (9) or (10) so that the relative distance L may be calculated.

Also, by use of the timer shift T01 or T02 calculated based on equation (7) or (8), the timers 22 and 12 are adjusted to each other. For example, in the base station 10, the base station controller 11 adjusts the timer 12 by timer shift T02 with reference to the timer 22 of the mobile station 20. In the mobile station 20, the similar adjustment may be carried out.

After eliminating the timer shift, the relative distance L may be calculated based on the following equation:

Distance $L$=velocity of light×phase difference (11)

Next, a distance error to be calculated based on the phase difference will be explained.

Figure 4:
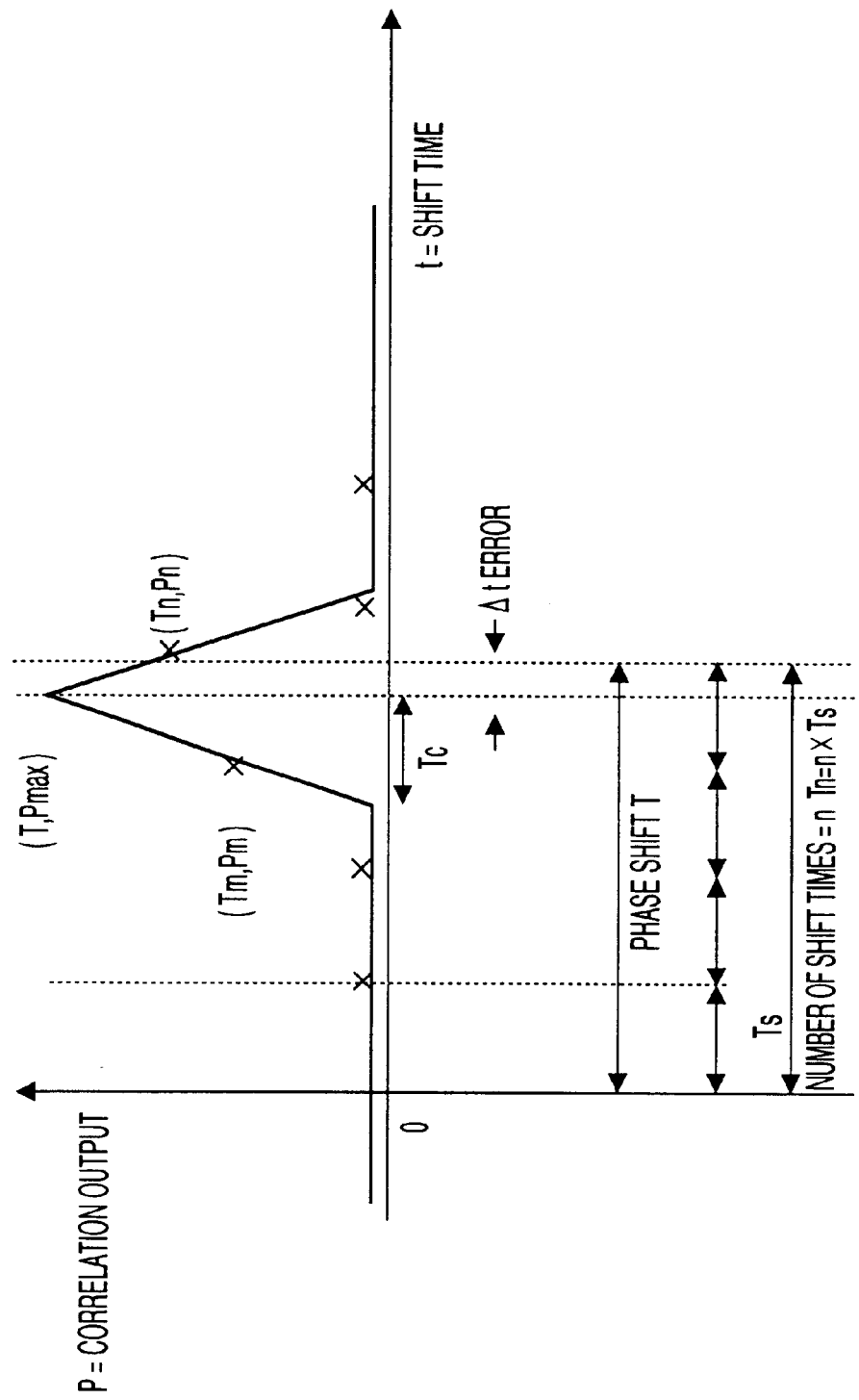
FIG. 4 is a view showing a correlation output to explain an approximate calculation of the phase difference according to the first embodiment of the present invention.

FIG. 4 is a graph showing the relationship among the aforementioned phase difference T, shift time t of the spreading code C due to the sliding correlator (15, 25), and a correlation output P obtained when the despreading is carried out by a despreading code C'. In the figure, a horizontal axis indicates shift time t of the spreading code C due to the sliding correlator, and a vertical axis indicates a correlation output P. In order to simplify the explanation, the relationship of fs/fc=1 is established between the sample rate fs (period Ts) and the chip rate fc (period Tc) in the figure.

A feature of the spreading code to be used in the spread spectrum communication will be explained as follows:

When a difference $\Delta t$ between spreading code and despreading code is 0, a maximum correlation output Pmax can be obtained. Then, correlation output decreases in proportional to an absolute value of difference $\Delta t$, and when the absolute value of difference $\Delta t$ is Tc or more, correlation output becomes almost zero. This can be expressed by the following equations (12) and (13):

When $T-Tc \leq t \leq T$, $P=(P\mathrm{max}/Tc) \times (t-T) + P\mathrm{max}$ (12)

When $T \leq t \leq T+Tc$, $P=-(P\mathrm{max}/Tc) \times (t-T) + P\mathrm{max}$ (13)

The phase difference T can be approximately detected by shift time Tn obtained when the correlation output reaches to a maximum value.

The difference between shift time Tn obtained when the correlation output reaches to a maximum value and phase difference T becomes the largest when phase difference T exists at the center of sample period Ts.

Since distance error $\Delta x$ can be obtained by multiplying time error and velocity of light together, the following relationship can be established:

$\Delta x \leq c \times Ts/2$

Velocity of light $c=3.0 \times 10^8 [m]$

If sample rate fs=15 MHz=$1.5 \times 10^7$ [sec.], $\Delta x \leq 10$ [m] can be obtained.

Moreover, in order to improve the detecting accuracy of phase difference, approximate calculation is carried out using a sample value whose correlation output is than a fixed value based on the correlation function of equations (12), (13), so that the phase difference for can be obtained. In the example of FIG. 4, sample values of (Tm, Pm), (Tn, Pn) are used. If (Tm, Pm) is substituted into equation (12), and (Tn, Pn) is substituted into equation (13), phase difference T can be obtained since two linear expressions for two values of unknowns T, Pmax are established.

In the example of FIG. 4, since Tn=Tm+Ts=Tm+Tc is established, the calculation becomes simple, and phase difference T can be obtained by the calculation of equation (14).

$T=Tn-\{P1Tc/(P1+P2)\}$ (14)

If an error of correlation output P is 10% and an error of sampling period Ts can be ignored with respect to the error of the correlation output, the error of T results in 10% order of Ts. Moreover, the distance error results in 1 [m] order when fs=15 mHz and 10 [cm] order when fs=150 MHz.

In order to simplify the explanation, fs/fc=1 was used in the above case. However, if a large value is given to fs/fc, more correct approximation can be obtained.

According to the above-explained embodiment, the base station 10 (target station) can transmit a signal to mobile station 20 asynchronous with a signal received from mobile station 20. For this reason, the base station 10 can carry out data communications in asynchronization with the signal from the mobile station 20. Also, since data communications are not carried out based on the premise that the target station performs synchronous transmission, reliability of accuracy in the distance detection can be improved.

The first embodiment explained the distance detection between the base station 10 and the mobile station 20, and the detection of the timer shift therebetween. The present invention can be applied to the distance detection between the mobile stations such as automobiles, and the detection of the timer shift therebetween. The distance between the mobile units such as automobiles is detected, and inter-vehicle detected information can be used as control information of mobile units. Also, inter-vehicle detected information is sent to a traffic control system so as to be used to generate traffic congestion information.

(Second embodiment)

The second embodiment comprises a function for selecting a receiving signal of the radio signal propagated for a shortest distance from the base station 10 in addition to the functions of the mobile station 20 explained in the first embodiment.

Figure 5:
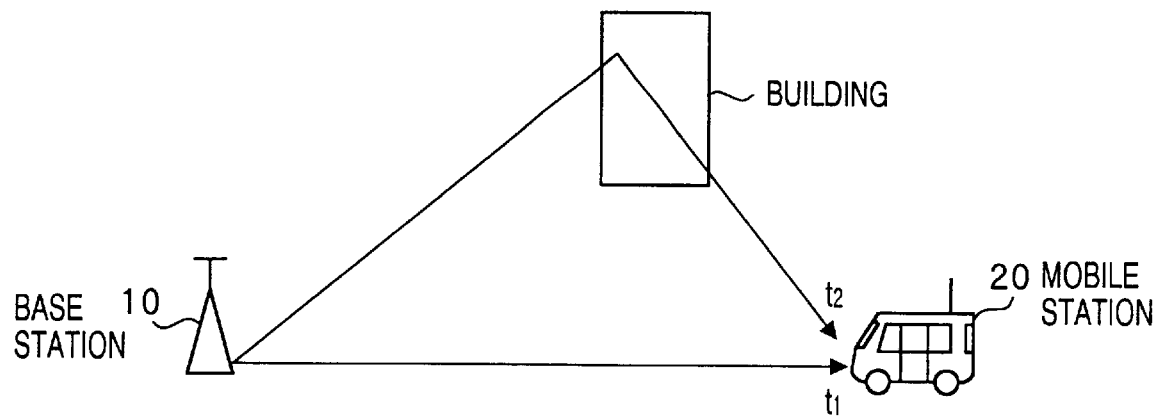
FIG. 5 is a propagation channel of a reception wave between communication stations according to a second embodiment of the present invention.

As shown in FIG. 5, when the base station 20 is positioned on condition that a building (obstruction) exists, the mobile station receives radio signals, which have reflected on the building and propagated, in addition to the radio signal propagated a linear distance (shortest distance) between the base station 10 and the mobile station 20 at the same time.

Figure 6:
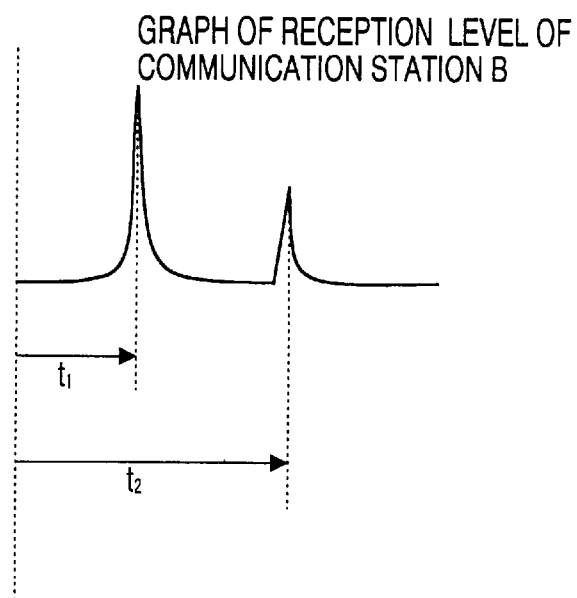
FIG. 6 is a waveform view showing a reception level at the receiver station according to the second embodiment.

At this time, the radio signal propagated the linear distance (shortest distance) between the base station 10 and the mobile station 20 reaches the mobile station 20 at the earliest as shown in FIG. 6, and attenuation of the radio signal is the smallest. Therefore, in the mobile station 20 as the receiver station, the signal propagated for the shortest distance is detected as being the closest to the reference timing of the timer 22 in a plurality of reception paths and the highest reception level.

In this embodiment, the reception path having the earliest timing of the plurality of detected reception paths is regarded as one that has propagated for the shortest distance between the communication stations, the reception paths due to reflected wave is removed. Or, the reception path having the highest reception level of the plurality of detected reception paths is regarded as one that has propagated for the shortest distance between the communication stations, and the reception paths due to reflected wave are removed. Or, the path, which is the closest to the reference timing of the timer and which is the highest level, is selected from the plurality of reception paths.

According to the aforementioned embodiment, the reception paths due to the reflected wave can be efficiently removed. As a result, the phase difference can be detected based on the signal propagated for the shortest distance and the detection of the timer shift can be carried out.

(Third embodiment)

The third embodiment shows a case in which the detection of the distance between the communication stations having a CDMA communication apparatus mounted thereon is carried out based on the aforementioned distance detection method and communication of the other data is carried out therebetween at the same time. Information, which is communicated simultaneously with the detection of the distance between the communication stations or that of timer shift, is arbitrarily selected.

As shown in FIG. 7, mobile units A and C belong to the same group, and a mobile unit B, which does not belong to the same group, is sandwiched between the mobile units A and C. The mobile unit C detects not only the phase difference of the signal from the mobile unit A but also receives vehicle information (e.g., car number) of the mobile unit A radio transmitted from the mobile unit A at the same time. Then, the mobile unit C determines whether or not the mobile unit B running forward belongs to the same group as that of the self-mobile unit. The mobile unit C follows the mobile unit A based on vehicle information of mobile unit A.

According to the aforementioned embodiment, it is unnecessary to send back the response wave in synchronous with the received signal from the target station to detect the distance between the communication stations. As a result, other information can be received and transmitted simultaneously with the detection of distance or that of the timer shift.

(Fourth embodiment)

This embodiment shows a relative velocity detecting apparatus in which the detection of the distance between the communication stations having a CDMA communication apparatus mounted thereon is carried out a plurality of times based on the aforementioned distance detection method, and a relative velocity between the communication stations is detected from a difference in the relative distance and time difference in timing of the detected distance.

Figure 8:
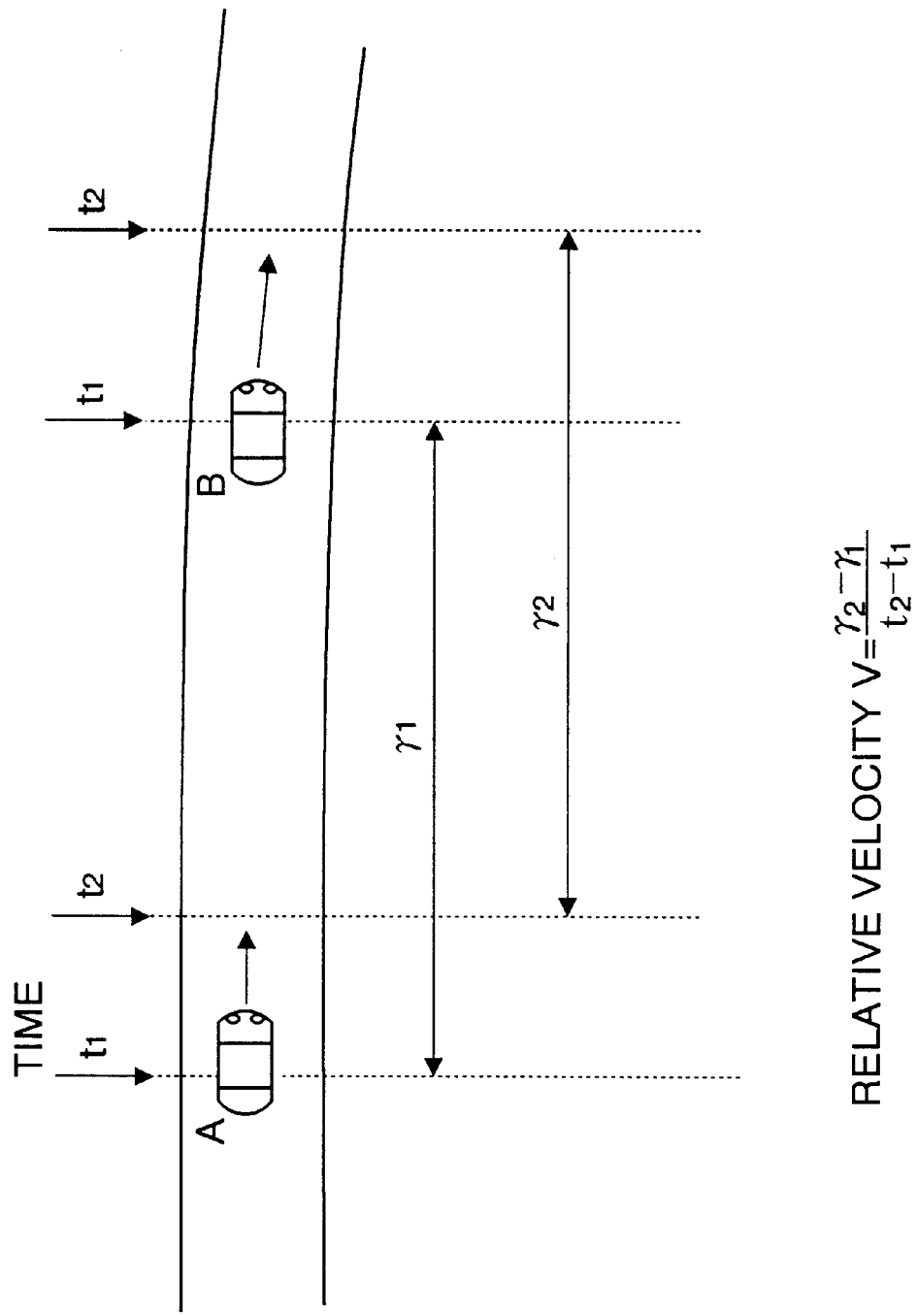
FIG. 8 is a conceptual view explaining a principle of relative velocity detection between communication stations according to a fourth embodiment of the present invention.

As shown in FIG. 8, when vehicles A and B are moving on the same straight line, the distance detection is executed a plurality of times by the same system as used in the mobile station of the first embodiment. In the vehicle A, the relative velocity between the vehicle A and the vehicle B at the current state is detected based on the following equation:

$$\text{Relative velocity } V=(r2-r1)/(t2-t1) \tag{15}$$

where r1 is a relative distance detected at time t1 and r2 is a relative distance detected at time t2.

According to this embodiment, the relative velocity between the base station and the target station can be detected by use of the detected relative distance.

(Fifth embodiment)

This embodiment shows a CDMA radio communication apparatus in which receiving and transmitting are performed by the spread spectrum communication system to carry out the distance detection of the aforementioned distance detection system and transmission power is determined based on relative distance information obtained at this time.

In the radio signal propagating in the space, energy spreads and attenuates with an increase in the propagation distance. An attenuation factor of the signal becomes a monotone decreasing function of relative distance between the communication stations. The detected relative distance is applied to the logic equation of the aforementioned function or the experimental equation so to obtain the attenuation factor. Then, transmission power of the communication station on the sender side is adjusted, so that the reception level of the communication station on the receiver side is controlled.

According to this embodiment, transmission power can be controlled to a suitable value based on distance information obtained by the distance detection.

(Sixth embodiment)

This embodiment shows a TDMA communication system, which is used as a system for receiving and transmitting a certain signal having periodicity.

Figure 9:
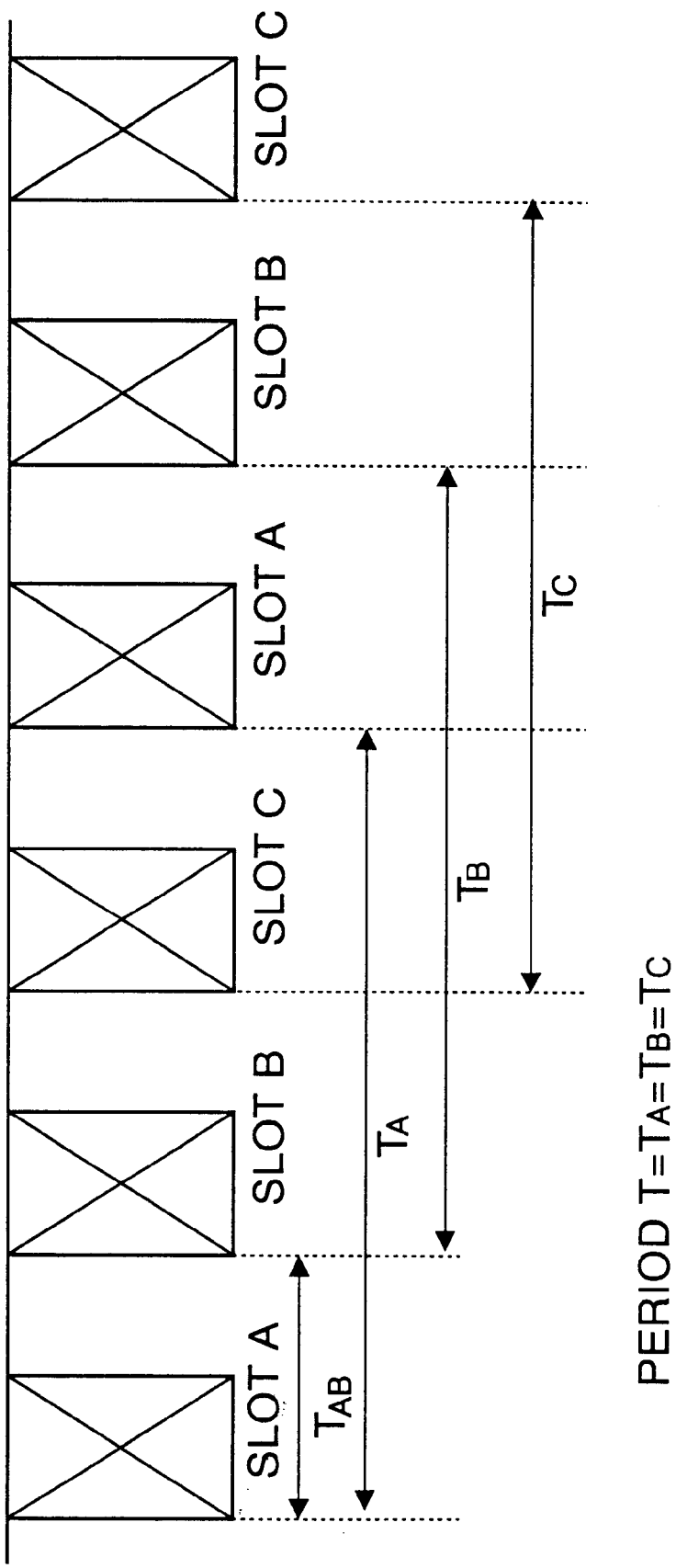
FIG. 9 is a view showing a transmission period of TDMA system according to a sixth embodiment of the present invention.

As shown in FIG. 9, the TDMA communication system is a communication system in which each communication station performs transmission at a predetermined timing allocated for each communication station at a fixed period. The predetermined timing (slots A, B, C) allocated by the TDMA system is provided with an allowance for delay of propagation time due to distance between the communication stations, and each communication station transmits the signal asynchronously in the range of the allowance.

Figure 10:
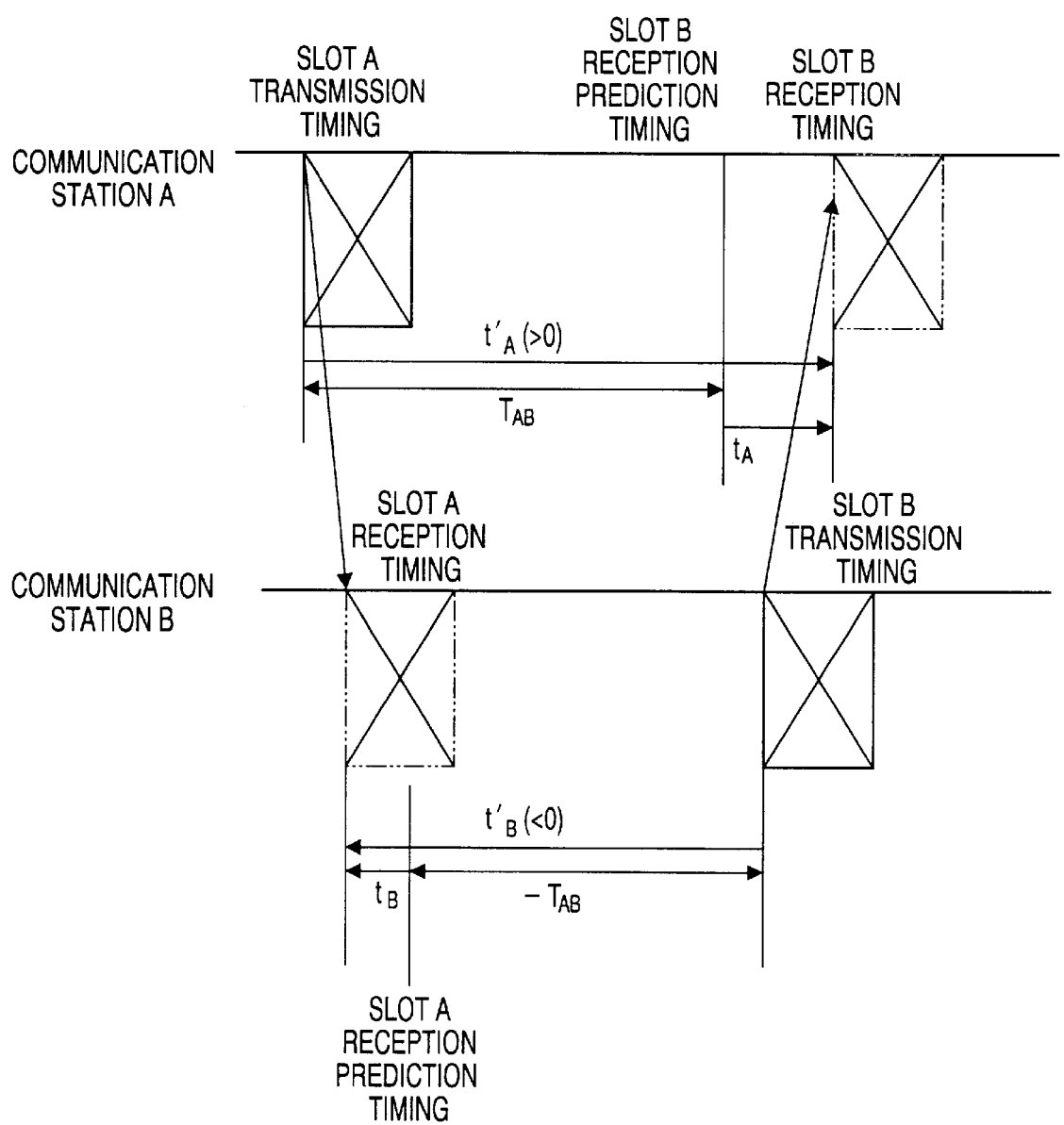
FIG. 10 is a view explaining a principle of a phase difference detection according to the sixth embodiment of the present invention.

FIG. 10 shows a timing chart between the communication stations A and B. the communication stations A, B radio transmit transmission data when reference timing (slot A transmission timing, slot B transmission timing), which is provided by the timer of each station, comes.

The communication station A to which slot A is allocated as transmission timing can predict reception timing (slot B reception prediction timing) of transmission data, which the communication station B to which slot B is allocated as transmission timing has transmitted at slot B, based on the self-timer. In the communication station A of FIG. 10, time $T_{AB}$ is used as slot B reception prediction timing. Then, slot B reception timing $t_A'$ wherein slot B has actually been received is detected.

According to this embodiment, phase difference $t_A$ is obtained from time $t_A'$ and time $T_{AB}$ by the following equation:

$$\text{Phase difference } t_A = \text{time } t_A' - \text{time } T_{AB} \tag{16-1}$$

where time $t_A'$ is one that passes before slot B reception timing is detected from slot A transmission timing based on the timer of the communication station A, and time $T_{AB}$ is a period from slot A transmission timing to slot B reception prediction timing.

In this case, since phase difference $t_A$ to be calculated is time including propagation delay between the communication stations A and B and timer shift, this has the same meaning as phase differences T1, T2 explained in the aforementioned embodiment. Therefore, similarly in the communication station B, phase difference $t_B$ is obtained by the following equation, so that the distance detection and timer shift detection can be obtained:

$$\text{Phase difference } t_B = \text{time } t_B' + \text{time } T_{AB} \qquad (16\text{-}2)$$

(Seventh embodiment)

This embodiment shows a position specifying apparatus for specifying an absolute position of the communication station whose position is unknown by use of the aforementioned distance detecting system. In this case, either CDMA or TDMA may be used as a communication system.

Figure 11:
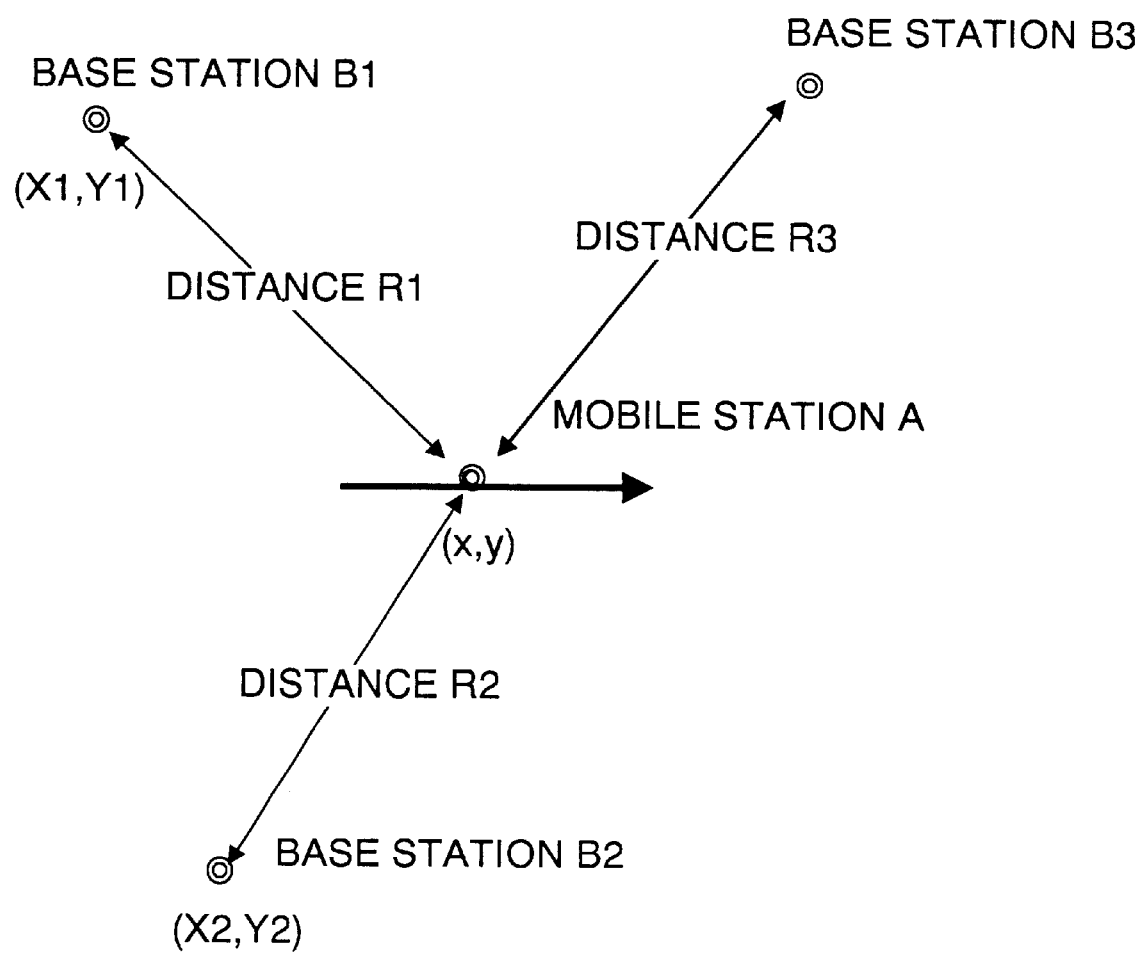
FIG. 11 is a view showing the positional relationship between the mobile station and the base station according to a seventh embodiment of the present invention.

This embodiment will be explained with reference to FIG. 11. Radio communication between the mobile station whose position moves with time and is unknown and a plurality of base stations B1, B2, B3 whose position is fixed carried out.

To simply the explanation, it is assumed that the mobile station A and the base stations B1, B2, B3 are placed on the ground, which can be regarded as being substantially flat. Also, the positional coordinates of the mobile station A are set to (x, y), those of the base station B1 are set to (X1, Y1), those of the base station B2 are set to (X2, Y2), and those of the base station B3 are set to (X3, Y3).

The mobile station A performs radio communication with three base stations B1, B2, B3, thereby detecting relative distances R1, R2, R3 using the distance detection system shown in the aforementioned embodiment.

The relationships shown in the equations (17), (18), (19) are established between the relative distances R1, R2, R3 and the positional coordinates:

$$(x-X1)^2 + (y-Y1)^2 = R1^2 \qquad (17)$$

$$(x-X2)^2 + (y-Y2)^2 = R2^2 \qquad (18)$$

$$(x-X3)^2 + (y-Y3)^2 = R3^2 \qquad (19)$$

Since unknowns for three quadratics are two, that is, x, y, x and y can be obtained from the above equations (17), (18), (19).

As mentioned above, according to the present invention, there can be provided a distance detecting method and its apparatus wherein a sender station and a receiver station can receive and transmit a signal asynchronously by use of a spreading code generated at the timer of each station, other information can be simultaneously communicated and a distance detection having high reliability can be performed without exerting influence upon synchronous accuracy of the receiver station.

The present invention is not limited to the above described embodiments, and various variations and modifications may be possible without departing from the scope of the present invention.

This application is based on the Japanese Patent Application No. HEI10-73186 filed on Mar. 5, 1998, entire content of which is expressly incorporated by reference herein.

What is claimed is:

1. A method for detecting a distance between a communication station and a target station in a CDMA system, the method comprising:

transmitting a first periodic information signal from the communication station to the target station, so as to detect a first phase difference at the target station, wherein said first periodic information signal is generated with reference to a clock generated by a timer of the communication station, and said first phase difference represents a time difference between a first reference time based on a clock generated by a timer of the target station and a detection time of the first periodic information signal at the target station;

receiving a second periodic information signal at the communication station transmitted from the target station upon receipt of said first periodic information signal, so as to detect a second phase difference at the communication station, wherein said second periodic information signal is generated with reference to the clock generated by the timer of the target station, and said second phase difference represents a time difference between a second reference time based on the clock generated by a timer of the communication station and a detection time of the second periodic information signal at the communication station;

detecting a difference between the timer of the communication station and the timer of the target station by use of said first phase difference and said second phase difference; and detecting the distance between the communication station and the target station by use of the detected difference of the reference times of the timers and at least one of said first phase difference and said second phase difference, wherein said first periodic information signal and said second periodic information signal each transmit information used to detect a distance as well as information other than information used to detect a distance.

2. The distance detection method according to claim 1, further comprising adjusting the reference time of the timer of the communication station and the reference time of the timer of the target station to each other based on the detected difference of the reference times of the timers, wherein the distance between the communication station and the target station is calculated based on the following equation after adjusting the reference time of the timer of the communication station and the target station:

Distance=K×first phase difference where K is a constant corresponding to the velocity of light.

3. The distance detection method according to claim 1, wherein said detected difference in the reference times is used as a difference of the timer of the target station, and the distance between the communication station and the target station is calculated based on the following equation:

Distance=K×(first phase difference−difference of the timer of the target station)

where K is a constant corresponding to the velocity of light.

4. The distance detection method according to claim 1, wherein said difference between the timer of the communication station and the timer of the target station is detected with reference to the timer of the communication station based on the following equation:

difference=(first phase difference−second phase difference)/2.

5. A distance detector that detects a distance between a communication station and a target station in a CDMA system, comprising:

a transmitter that transmits a first periodic information signal from the communication station to the target station, so as to detect a first phase difference at the target station, wherein said first periodic information signal is generated with reference to a clock generated by a timer of the communication station, and said first phase difference represents a time difference between a first reference time based on a clock generated by a timer of the target station and a detection time of the first periodic information signal at the target station;

a receiver that receives a second periodic information signal at the communication station transmitted from the target station upon receipt of said first periodic information signal, so as to detect a second phase difference at the communication station, wherein said second periodic information signal is generated with reference to the clock generated by the timer of the target station, and said second phase difference represents a time difference between a second reference time based on the clock generated by a timer of the communication station and a detection time of the second periodic information signal at the communication station;

a timer difference detector that detects a difference between the timer of the communication station and the timer of the target station by use of said first phase difference and said second phase difference; and a distance detector that detects a distance between the communication station and the target station by use of the detected difference of the reference times of the timers and at least one of said first phase difference and said second phase difference, wherein said first periodic information signal and said second periodic information signal each transmit information used to detect a distance as well as information other than information used to detect a distance.

6. The distance detector according to claim 5, further comprising a synchronization apparatus that adjusts the reference time of the timer of the communication station and the reference time of the timer of the target station to each other based on the detected difference of the reference times of the timers, wherein the distance between the communication station and the target station is calculated based on the following equation after adjusting the reference time of the timers of the communication station and the target station:

$$\text{Distance} = K \times \text{first phase difference}$$

where K is a constant corresponding to the velocity of light.

7. The distance detector according to claim 5, wherein said detected difference in the reference time is used as a difference of the timer of the target station, and the distance between the communication station and the target station is calculated based on the following equation:

$$\text{Distance} = K \times (\text{first phase difference} - \text{difference of the timer of the target station})$$

where K is a constant corresponding to the velocity of light.

* * * * *